July 25, 1933.  S. E. PETERS  1,919,743
TEMPERATURE CONTROLLED FURNACE FAN
Filed Aug. 29, 1931  3 Sheets-Sheet 1

INVENTOR
Samuel E. Peters
BY
ATTORNEY

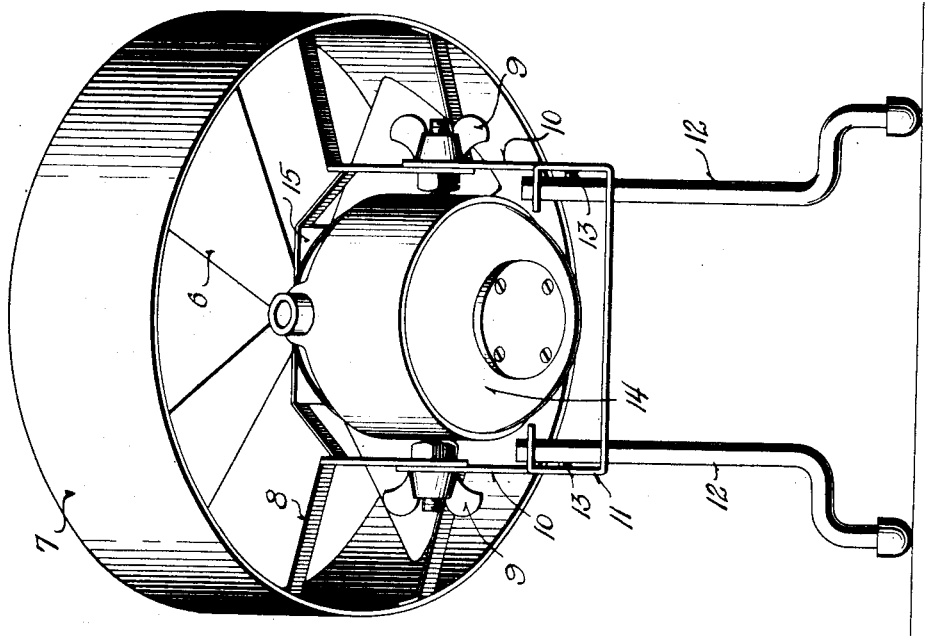
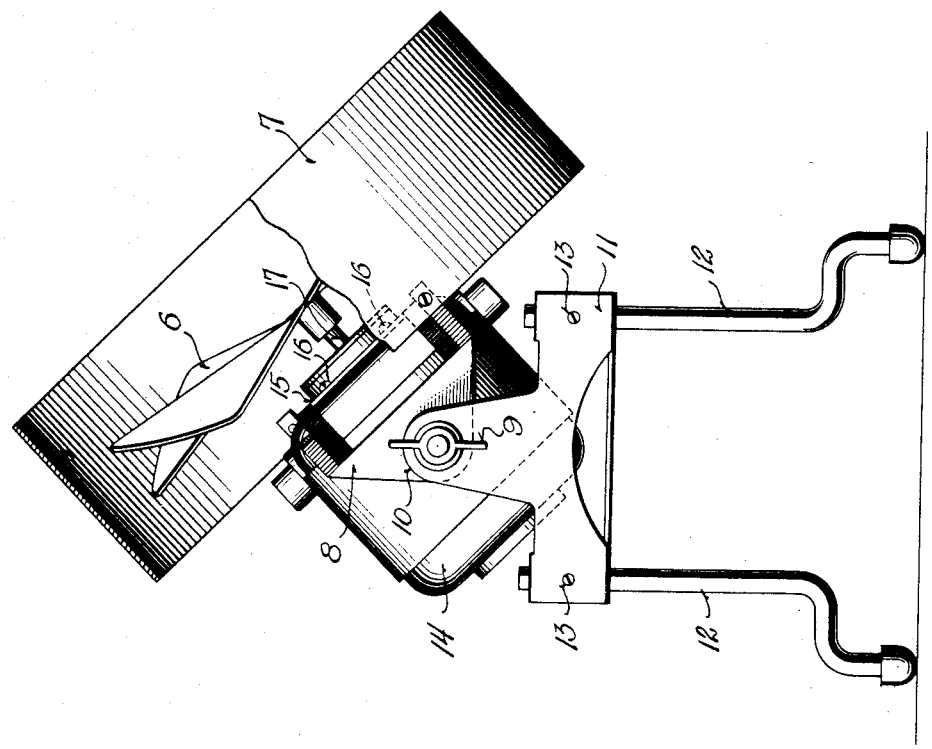

July 25, 1933. S. E. PETERS 1,919,743
TEMPERATURE CONTROLLED FURNACE FAN
Filed Aug. 29, 1931 3 Sheets-Sheet 3
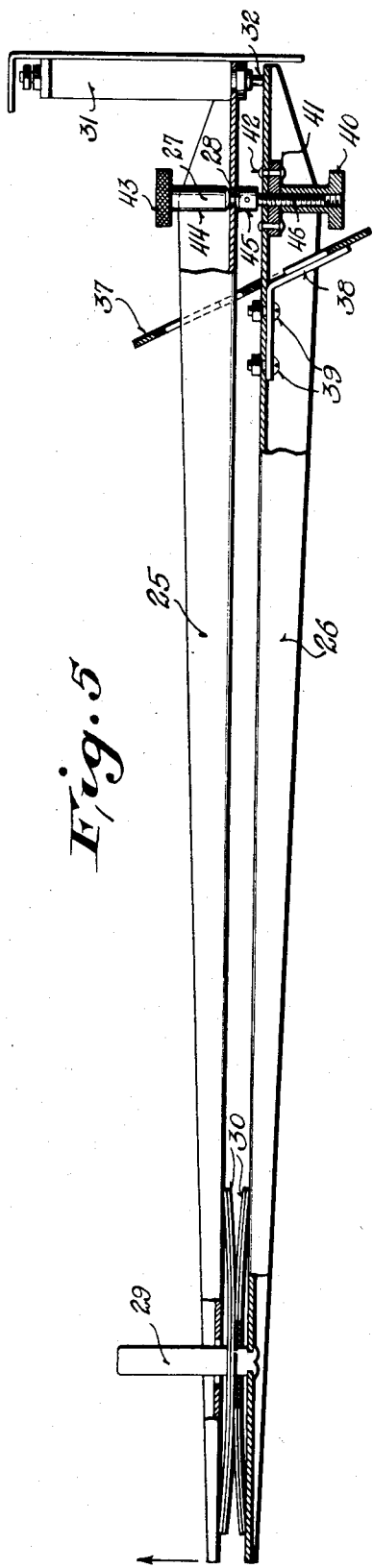
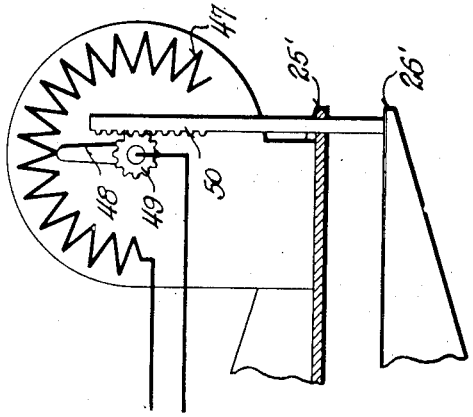
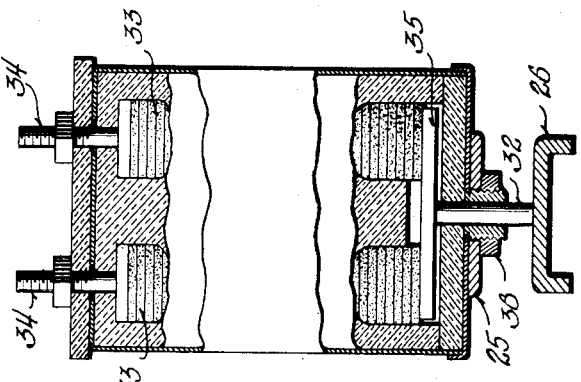
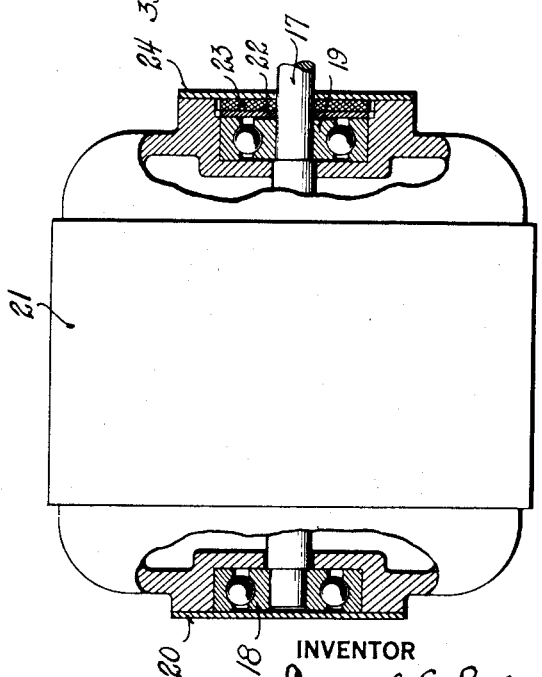
INVENTOR
Samuel E. Peters
BY
ATTORNEY Patented July 25, 1933

1,919,743

UNITED STATES PATENT OFFICE

SAMUEL E. PETERS, OF RACINE, WISCONSIN, ASSIGNOR TO ROAN MFG. CO., OF RACINE, WISCONSIN, A CORPORATION OF WISCONSIN

TEMPERATURE CONTROLLED FURNACE FAN

Application filed August 29, 1931. Serial No. 560,137.

The purpose of this invention is to improve the operation of the common hot air, central heating plant. The invention also serves to improve the operation of any air or fluid heating device which is subject to the same difficulties as the hot air plant. The improvement is accomplished by increasing the velocity, over the heating surface, of the air or fluid being heated, and by adding a kinetic head to the static head normally relied upon to produce circulation. It is the further purpose of this invention to provide the increased circulation as well as the added kinetic head only when needed and then just to the degree necessary.

In this invention, to accomplish the purposes above set forth, an air-moving means is directed toward a heating surface. The air-moving means is energized by a flow of energy which is caused to pass through a controlling device placed close to the heating surface. The resistance of said controlling device to the flow of energy is variable with temperature, the resistance decreasing as the temperature rises. This novel combination of elements is adapted to bring about in the operation of a hot air plant a marked improvement in operation.

The common hot air plant is constructed with a part which can be called the stove, in which heat is liberated, a part surrounding the stove, which can be called the shell, conduits extending from the shell, which can be called the distributing system, and the return system. In the operation of such a plant the heat liberated within the stove is conveyed to and through the walls thereof and is delivered to the air within the shell partly by radiation but principally by convection. The air within the shell upon being heated becomes of lower density than the air in the return system. This difference in density produces an unbalanced aerostatic condition and the heated air within the shell rises and begins to fill the distributing system. As the distributing system fills with heated air the unbalanced aerostatic condition increases in magnitude, inducing a noticeable drifting of air through the system. The drifting or circulating of the air out through the distributing system and back through the return system is maintained by the release of heat on the part of the stove. The rate at which the stove releases heat is a controlling factor in the rate of circulation. Under normal circulation the degree of unbalance of the aerostatic condition is not great and in order to encourage a maximum circulation all conduits through which air is flowing are made of ample dimensions. By so doing frictional losses which would impede circulation are reduced to a minimum. However, the ample dimensions of the system involve low velocities in the moving air and the air which is being heated as it passes through the shell moves rather slowly.

The rate of heat transfer from a heated surface to an ambient fluid in contact therewith varies pronouncedly with the rate of flow of the ambient fluid. A condition very unfavorable for the transfer of heat therefor exists in the common hot air furnace and the capacity of such furnaces is sharply limited. With the amount of aerostatic unbalance available for inducing circulation this limitation in capacity cannot be removed without some added influence. Fans or other means for augmenting the circulation have been placed in the return system or in other suitable locations so that a kinetic head is added to the aerostatic head. By such means it is possible to increase the air velocity through the shell and to bring about an increase in heat transfer to the air in the shell and consequently an increase in the capacity of the furnace. The rate of circulation, however, cannot be increased beyond a certain limit, which limit is set by the toleration of the user for drafts projected into the space being heated.

In connection with the use of circulation augmenting means wherein fans are employed, means for automatically starting and stopping the fan have been used. These control means consist in a thermostatically-operated switch or valve which furnishes energy to the fan-driving means when the furnace is being fired, and which interrupts the supply of energy to the fan-driving means when the temperature of the furnace drops below a predetermined point. This combination is objectionable inasmuch as the full effort of the fan is employed when in operation without regard to the rate of firing of the furnace. In moderate weather the annoyance of the vigorous circulation is still present, even though it is unnecessary. An effort to meet the varying conditions under which a furnace may be operated has been made with such devices. The thermostatically operated switch or valve has been made manually adjustable so that the motor may be made to start when the furnace reaches different predetermined temperatures. The speed of the motor may also be manually regulated to fit the circumstances. The attention required by such devices is inordinate and as a practical result the adjustment is so neglected that the usefulness of the device is greatly impaired. By means of this invention such objectionable features are avoided and an increase in comfort, capacity and efficiency results.

This invention is best explained with the help of the attending drawings, wherein Fig. 1 is a schematic view of a typical hot air system embodying this invention;

Fig. 2 is a partial section side view of the fan;

Fig. 3 is a rear view of the same;

Fig. 4 is a side view of the motor with parts broken away;

Fig. 5 is a detail side view of the control unit, with parts broken away;

Fig. 6 is a detail view of the rheostat with parts broken away;

Fig. 7 is a schematic showing of a slide wire rheostat;

Figure 1:
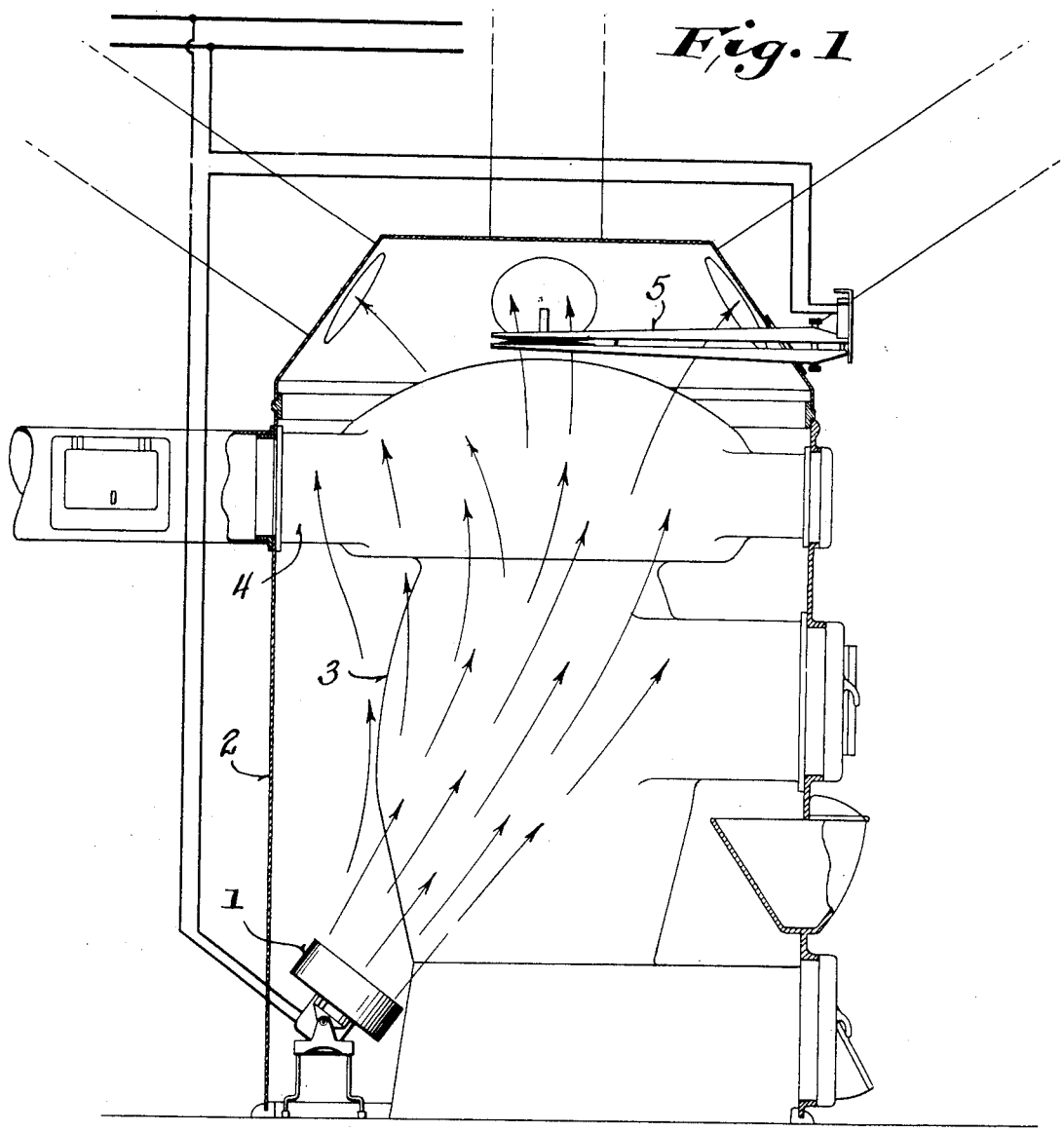

In Fig. 1 a fan or other suitable air-moving means is indicated at 1. The same is placed within the shell 2 and in close proximity to the walls of the stove 3. The fan is placed to direct a blast of air against the walls of the stove, as indicated by the arrows. By so placing the fan air is projected with high velocity against the walls of the stove. By thus causing the blast of air to impinge upon the surfaces of the stove great velocities are here obtained without inducing intolerable rates of circulation in the distributing system.

As indicated by the arrows in Fig. 1, the blast from the fan also sweeps over the upper portions of the stove and the stack 4. By causing the air to impinge upon the hot surfaces and to flow in the manner described, heat transfer coefficients are greatly raised and the stove releases heat to the air in the shell at a much greater rate. The higher rate of release of heat by the stove 3 produces higher temperatures in the distributing system, bringing about a greater degree of aerostatic unbalance and a greater rate of circulation. The capacity of the plant is decidedly increased. As is indicated by the arrows in Fig. 1, an appreciable part of the kinetic head of the fan reaches the distributing system and assists in circulation. However, the magnitude of this kinetic head is not sufficient to be objectionable, the main part of the impulse from the fan being employed principally for the improvement of the heat transfer rate. As a consequence of the greater rate at which the stove gives up its heat the combustion gases which leave the stove 3 through the stack 4 are reduced to a lower temperature and an appreciable gain in efficiency of the plant is produced.

Inasmuch as the service required of a heating plant is highly variable the usefulness of the fan 1 and its arrangements depends greatly upon its ability to adjust itself to the varying conditions under which the furnace is operated. The usefulness of this invention is derived largely from the novel means 5, Fig. 1, for controlling the fan 1. The control means 5 consists of any suitable resisting element whose resistance decreases rapidly and continuously as its temperature is increased. The resistance of control means 5 varies in such a manner that when the furnace is cold the fan 1 is stationary; when the furnace is moderately fired the fan 1 is moving at a moderate rate of speed; and when the furnace is fired at a high rate fan 1 is moving at maximum speed. All intermediate rates of firing have a corresponding speed for the fan.

The fan and motor for driving the same suitable for the purposes of this invention is shown in Figs. 2 and 3. The fan consists of a conventional blade 6 surrounded by a cylindrical guard 7. The cylindrical guard is supported by a W-shaped supporting member 8, which is clearly shown in Fig. 3. The supporting member 8 is rotatably secured by means of bolts and wing nuts 9 to upwardly extending lugs 10 which are an integral part of the main supporting frame 11. The main supporting frame 11 rests upon the legs 12, the legs being slidably mounted within the main frame 11 or secured thereto in any desired position by means of the setscrews 13. The motor 14 is mounted beneath the flat portion 15 of the W-shaped supporting member 8 and secured thereto by securing means 16. The shaft 17 of the motor extends through an opening provided in the flat portion 15 of the supporting member 8 and the blade 6 is secured thereto to rotate therewith. The above described structure is adapted for the purpose of causing a current of air to impinge upon the surfaces of various types of stoves in the most advantageous manner. The height of the fan may be adjusted by means of sliding the legs 12 in the frame 11 and by securing the adjustment by means of the setscrews 13. The angle at which the current of air is projected may be altered to meet various conditions by loosening the bolts and wing nuts 9 and by rotating the motor blade and guard as a unit. When the desired position is obtained the adjustment may be secured by tightening the bolts and wing nuts 9.

A motor specially constructed for the purpose of this invention is preferably used, for example, a motor provided with armature, field and commutator, wound and connected as a series motor of the type commonly called universal. The motor is especially enclosed and provided with bearings, as indicated in Fig. 4. The shaft 17 is mounted on suitable bearings 18 and 19. The end of the shaft 17 terminates within the bearing 18. The bearing 18 and the end of the shaft 17 are protected by a cover plate 20 secured to a casing 21 so as not to admit destructive foreign matter. The casing 21 is continuous with the exception of small inspection holes, not shown, through which no appreciable quantity of destructive foreign matter may enter. The bearing 19 is covered with a metallic protecting washer 22, a felt protecting washer 23 and cover plate 24. By so constructing the motor the bearings 18 and 19 are well protected against the entrance of abrasive foreign matter. Sufficient lubricant may be assembled with the bearings to last for long periods.

The motor and fan above described are, for the purpose of this invention, used in conjunction with appropriate control means. One form of control means which is very suitable is illustrated in Figs. 5 and 6. The location of the control means when in use is indicated in Fig. 1, the control means being designated therein by the numeral 5. The device as indicated in Fig. 5 employs beams 25 and 26. Said beams are cooperatively secured to one another by means of a rocker screw 27 so that the beams may be moved with respect to one another as indicated by the arrow at the tip of beam 25. This motion is made possible by the clearance provided at the rocking point 28 and by the flat guide member 29 slidably mounted in an opening in beam 25 and secured to beam 26.

Thermostatic members 30 are each composed of two flat strips of differing metal which are securely united face to face. The metals employed should differ appreciably in thermal coefficients of expansion. For example, united strips of brass and mild steel may be employed. The thermostatic strips are longitudinally slotted for a short distance at the center of their faces so that they may be slidably mounted upon the flat guide member 29, as shown in Fig. 5. For the maximum effect the thermostatic strips should be assembled with like metals facing, preferably the metal with the greater coefficient of expansion occupying the interior position. As the temperature of the thermostatic members is increased, motion, as indicated by the arrow, takes place, causing the opposite ends of the beams to approach one another.

Secured to beam 25 is a compressible pile rheostat 31. The actuating plunger 32 of the rheostat 31 extends downwardly, contacting with the surface of beam 26. As the motion indicated by the arrow takes place pressure is exerted upon the plunger 32 and communicated to rheostat 31, decreasing the resistance thereof.

In Fig. 6 is shown a detailed view of the rheostat with portions broken away. Beam 26 is shown bearing upon plunger 32 and exerting pressure upon the two parallel rows of carbon plates 33. Current flowing between terminals 34 passes down one of the piles 33, crosses the connector bar 35 and passes upward through the other compressible pile 33 to the other terminal 34. Beam 25 is secured by member 36 to the body of the rheostat.

In operation the thermostatic elements 30 and the portions of the beams 25 and 26 associated therewith are placed in close proximity with the heated stove and hereinafter we will refer to this portion of the control means as the hot end. The portion of the beams 25 and 26 associated with the rheostat 31 is removed a substantial distance from the heated stove and is preferably arranged upon the exterior of the furnace. Hereinafter we shall refer to such portion of the control means as the cold end.

A typical manner of installing the controlling device is indicated in Fig. 1, wherein a portion of the shell of the furnace has been cut away and the hot end of the control means inserted. The mounting is effected by securing, as in Fig. 5, a mounting plate 37 to the shell of the furnace. The mounting plate 37 is secured to beam 26 by means of a bendable member 38 and fastening means 39. By employing a construction of this type the control means may be readily installed in the conventional furnace with the hot end in the desired location and by bending member 38 may quickly adjust plate 37 to any one of a number of shapes or forms which the shell of the particular furnace may possess. When the mounting plate 37 is attached the rocker member 27 of the control means is secured to the cold end of the beam 26 by means of a locking screw 40, the nut 41 and the securing means 42. As indicated in Fig. 5, the rocker member comprises as an integral unit a knurled head 43, a shank 44, boss 45 and a screw 46. The position in which the rocker member 27 is secured upon installation is that one which will bring the cold end of beam 26 to bear lightly upon the plunger 32 when the furnace is cold. As the stove is fired the thermostatic members 30 bow out, causing the motion indicated by the arrow and causing the cold end of beam 26 to exert pressure upon plunger 32. This movement causes an increase in the supply of electrical energy to fan 1, indicated in Fig. 1. The arrangement of parts above described causes the fan 1, Fig. 1, to operate at varying speeds as the temperature of the stove varies, each particular temperature of the stove causing a particular speed of the fan. No further manual adjustment of the control means or of the fan is required. As the conditions under which the furnace is operated vary the fan performs its function to the extent which the particular conditions require.

In Fig. 7 is shown a modification of the cold end of the control means which might be employed. In this device a resistance wire 47 is secured by proper insulating means to the cold end of beam 25'. Likewise, secured to the cold end of beam 25' is the contact 48 which is rotatably secured with respect to resistance wire 47. Secured to the contact member 48 is a pinion 49 which is cooperatively connected with a rack 50 so that as the rack 50 is moved vertically contact member 48 rotates in contact with the resistance wire 47. The rack 50 is in turn secured to the cold end of beam 26' and moves therewith. The operation of such a device is similar to the operation described for the carbon pile device.

Figure 8:
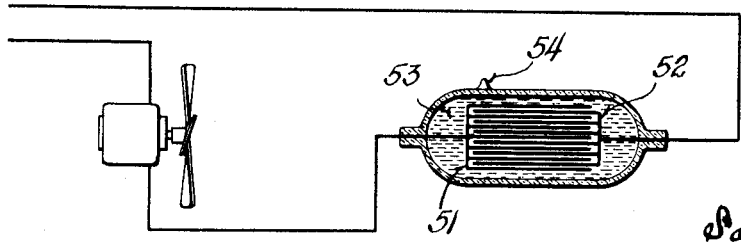
Fig. 8 is a schematic showing of the use of an electrolytic control unit.

The device of this invention may also be modified as indicated in Fig. 8 wherein electrodes 51 and 52 are immersed in electrolyte 53 sealed within a container 54. The electrolyte may be a weak solution of an acid whose conductivity increases with temperature. The electrodes may be of appropriate noncorrosive materials, their area being substantial and the degree of separation not too great. When this form of device is employed the entire control unit is placed in close proximity to the surface of the stove.

The type of motor described as a series wound universal motor is well adapted for the purposes of this invention. Other types of motors may be effectively employed. Various forms of shunt connections may be used to modify the arrangement and these forms are contemplated within the scope of this invention. Alternating current motors of the induction type may be employed. These may be controlled by the use of variable impedances actuated by thermostatic elements. Such constructions are likewise contemplated Other energizing means than electricity, such as moving fluid systems, may be employed in carrying out the purposes of this invention.

It is desired that it be understood that this invention is not to be limited to any specific form or arrangement except insofar as such limitations are specified in the claims.

What I claim as my invention is:

1. In a fluid heating device, the combination of a source of heat, a wall enclosing said source of heat through which heat may be conducted, an enclosure through which a fluid to be heated is conveyed in contact with said wall, a fluid-moving means within said enclosure directed to cause said fluid to impinge upon said wall at increased velocity, means for supplying said fluid-moving means with a suitable source of motivating energy, and a control means in said supply means and in close proximity with said wall to control the supply of said motivating energy in quantity increasing with the temperature of said wall.

2. In a fluid heating device, the combination of a source of heat, a wall enclosing said source of heat through which heat may be conducted, an enclosure through which a fluid to be heated is conveyed in contact with said wall, an electrically driven fan within said enclosure directed to cause said fluid to impinge upon said wall at increased velocity, conductors connecting said electrically driven fan with a suitable electric source, and a thermostatically variable resistance placed in series with said electrically driven fan and in close proximity with said wall to control the supply of electricity in quantity increasing with the temperature of said wall.

3. In a fluid heating device, the combination of a source of heat, a wall enclosing said source of heat through which heat may be conducted, an enclosure through which a fluid to be heated is conveyed in contact with said wall, a fan within said enclosure and directed to cause said fluid to impinge upon said wall, a series wound electric motor drivingly connected with said fan, connections connecting said fan with a suitable source of electricity, a carbon pile rheostat placed in said connections, and thermostatic elements in close proximity to said wall and cooperatively connected with said rheostat to exert a pressure thereon which increases as the temperature of said wall increases.

4. In a fluid heating device, the combination of a source of heat, a wall enclosing said source of heat through which heat may be conducted, an enclosure through which a fluid to be heated is conveyed in contact with said wall, a fan within said enclosure and directed to cause said fluid to impinge upon said wall, an induction motor drivingly connected with said fan, connections connecting said fan with a suitable source of alternating electricity, a variable impedance placed in said connections, and thermostatic elements in close proximity to said wall and cooperatively connected with said impedance to vary the same as the temperature of said wall varies.

5. In a device for improving hot air plants, the combination of a furnace shell, a stove within said shell, air-moving means within the lower portion of said shell and directed to cause a current of air to impinge upon the surface of said stove, energy-supplying means connecting said air-moving means with a suitable source of motivating energy, and a control means in said supply means and in close proximity with said stove to control the supply of said motivating energy in quantity increasing with the temperature of said stove.

6. In a device for improving the operation of hot air plants, the combination of a furnace shell, a stove within said shell, a fan in the lower portion of said shell and directed to cause a current of air to impinge upon the surface of said stove, an electric motor drivingly connected with said fan, lead connections connecting said motor with a suitable source of electricity, and a thermostatically variable resistance placed in said lead connection and in close proximity to said stove so that the supply of electricity to said motor increases as the temperature of the stove increases.

SAMUEL E. PETERS.